(12) United States Patent
Whitworth et al.

(10) Patent No.: US 7,216,436 B2
(45) Date of Patent: May 15, 2007

(54) METHOD AND APPARATUS FOR LOCATING AND ALIGNING FASTENERS

(75) Inventors: Denver Whitworth, North Richland Hills, TX (US); Nicklas Gonzales, Flower Mound, TX (US); Vance Cribb, Grapevine, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 135 days.

(21) Appl. No.: 10/925,380

(22) Filed: Aug. 24, 2004

(65) Prior Publication Data

US 2006/0042068 A1    Mar. 2, 2006

(51) Int. Cl.
*B23Q 3/00*    (2006.01)

(52) U.S. Cl. .............................. 33/286; 33/227; 29/464

(58) Field of Classification Search ................. 33/286, 33/227, 228, 263, DIG. 21, 644–645, 275, 33/533; 29/464
See application file for complete search history.

(56) References Cited

U.S. PATENT DOCUMENTS

| | | | |
|---|---|---|---|
| 5,179,788 A * | 1/1993 | Jadach ........................ | 33/644 |
| 6,622,390 B2 * | 9/2003 | Brusius ....................... | 33/286 |
| 6,857,193 B2 * | 2/2005 | Kallesen et al. .............. | 33/286 |
| 6,986,209 B2 * | 1/2006 | Cook ........................... | 33/286 |
| 2002/0170190 A1 * | 11/2002 | Wetterlind .................... | 33/286 |
| 2004/0045178 A1 * | 3/2004 | Dameron ...................... | 33/286 |
| 2004/0111902 A1 * | 6/2004 | Fletcher ....................... | 33/286 |

* cited by examiner

*Primary Examiner*—Yaritza Guadalupe-McCall
(74) *Attorney, Agent, or Firm*—James E. Walton

(57) ABSTRACT

A method and apparatus for precisely locating, aligning, targeting, and marking locations for fastener holes in structures is disclosed. The method and apparatus utilizes laser devices to project laser beams through alignment tools to determine the proper location and orientation of the fastener holes.

20 Claims, 5 Drawing Sheets

METHOD AND APPARATUS FOR LOCATING AND ALIGNING FASTENERS

GOVERNMENT LICENSE RIGHTS

The U.S. Government has a paid-up license in this invention and the right in limited circumstances to require the patent owner to license others on reasonable terms as provided for by the terms of Contract No. N00019-00-C0183 awarded by NAVAIR.

BACKGROUND OF THE INVENTION

1. Field of the Invention

The present invention relates to methods and apparatuses for aligning and installing fasteners. In particular, the present invention relates to marking blank removable and interchangeable panels for drilling fastener holes.

2. Description of Related Art

Current methods for marking blank removeable and interchangeable panels include the use of hole finders, stud bolts, and/or custom jig tools. In the hole-finder and stud-bolt methods, hole locations are transferred to a parallel surface offset from the substructure. The main problem with these methods is that they are not sufficiently precise in replicating hole locations, i.e., they are not accurate within close tolerances and become increasingly more difficult to use as the curvature of the panel becomes more complex. Although custom jig tools provide a more accurate transfer of the hole locations to the blank panel, the monetary cost and process time make the use of custom jig tools prohibitive.

Thus, many shortcomings remain in the area of aligning and marking blank removable and interchangeable panels for the installation of fasteners.

SUMMARY OF THE INVENTION

There is a need for a method and apparatus for aligning and installing fasteners in which blank removable and interchangeable panels can be quickly and accurately marked for installing fasteners.

Therefore, it is an object of the present invention to provide a method and apparatus for aligning and installing fasteners in which blank removable and interchangeable panels can be quickly and accurately marked for installing fasteners.

This object is achieved by providing a system in which laser devices are utilized to project a point through an alignment tool to determine a fastener's perpendicularity to a surface.

The present invention provides significant advantages, including: (1) precision hole location transfer can be obtained on complex contour panels without the need for expensive custom jigs; (2) the process can be repeated in most conditions by a mechanic of any level; (3) the apparatus is formed from relatively inexpensive components that can be reused for different applications; and (4) the method be performed quickly and easily.

Additional objectives, features, and advantages will be apparent in the written description that follows.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

The present invention encompasses a method and apparatus for transferring hole locations from an existing structure to blank panels that are to be fastened to the existing structure, and to align the fasteners normal to the panel surface with close tolerances. In the preferred embodiment, the system of the present invention is used to locate and perpendicularly align fastener holes on removable and interchangeable panels of aircraft with tight tolerances. However, it will be appreciated that present invention may be used for locating, aligning, and/or installing parts in a wide variety of applications and in many different industries. The present invention is particularly well suited for precisely transferring hole locations from existing structures with complex contours to blank removeable or interchangeable panels so that fasteners holes that are perpendicular to the panel can be drilled in the panel.

Figure 1:
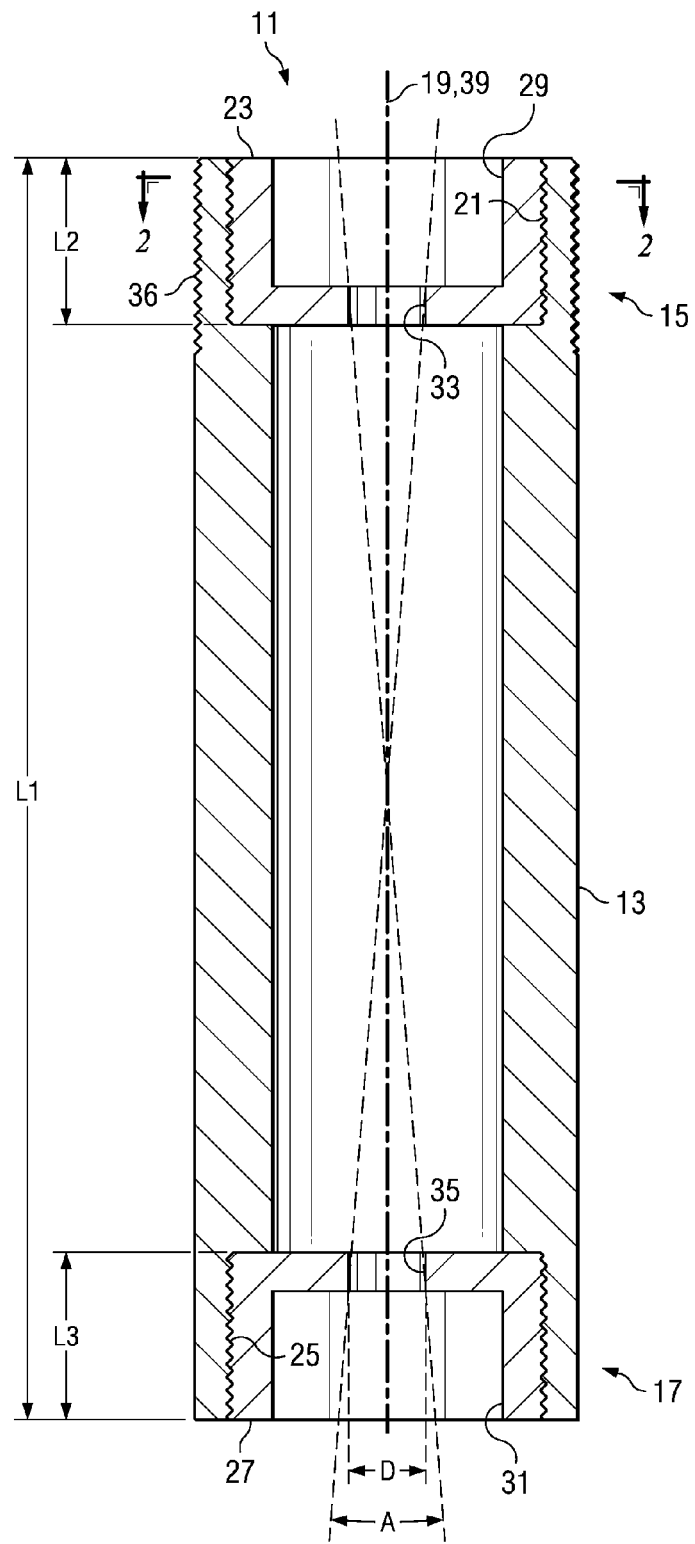
FIG. 1 is a longitudinal cross-sectional view of an alignment tool for use with the fastener location and alignment system according to the present invention.
Figure 2:
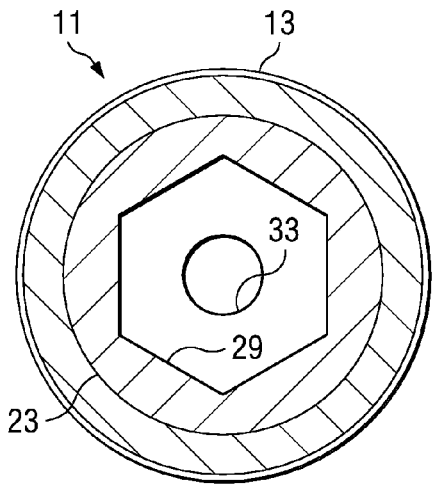
FIG. 2 is a cross-sectional view of the alignment tool of FIG. 1 taken at II—II.

Referring to FIGS. 1 and 2 in the drawings, an alignment tool 11 according to the present invention is illustrated in a longitudinal cross-sectional view taken through the middle of tool 11. Alignment tool 11 includes a hollow elongated shaft 13 having a base portion 15 and an opposing tip portion 17. Although alignment tool 11 has been shown as a cylindrical tube having a longitudinal axis 19, it should be understood that alignment tool 11 may be configured in a wide variety of geometric shapes, and may have multiple cross-sectional geometries along its length, depending upon the application in which alignment tool 11 is used. Alignment tool 11 is preferably formed from a metallic material, but may be formed from any suitable rigid material.

Base portion 15 of alignment tool 11 includes an attachment means 36 for releasably attaching alignment tool 11 to a structure 73 (see FIG. 4), as will be explained in more detail below. In the preferred embodiment, attachment means 36 is external threads sized and configured to mate with a fastener hole 72 (see FIG. 4) in structure 73. It will be appreciated that the connection between attachment means 36 and structure 73 may take on a wide variety of forms, including press fit, snap fit, twist lock, clamping, magnetic, adhesive, and other suitable forms depending upon the form of fastener hole 72.

Alignment tool 11 has an overall length L1. Base portion 15 includes a bore 21 into which is installed an insert 23. Bore 21 and insert 23 have a similar length L2. In a similar fashion, tip portion 17 has a bore 25 into which is installed an insert 27. Bore 25 and insert 27 have a similar length L3.

In the preferred embodiment, inserts 23 and 27 are threadingly installed into bores 21 and 25, respectively. To facilitate the installation of inserts 23 and 27 into bores 21 and 25, inserts 23 and 27 include interior hexagonal bores 29 and 31, respectively. This configuration allows for inserts 23 and 27 to be quickly and easily interchanged. It should be understood that the lengths of inserts 23 and 27 may be shorter or longer than the lengths of bores 21 and 23. Insert 23 includes a central axial alignment aperture 33. Likewise, insert 27 includes a central axial alignment aperture 35.

In the preferred embodiment, alignment apertures 33 and 35 are precisely axially aligned and are of the same size and cross-sectional shape. However, although alignment apertures 33 and 35 have been shown as being circular in cross-section, it will be appreciated that alignment apertures 33 and 35 may have other cross-sectional shapes, and may have shapes that are different from each other. By aligning alignment apertures 33 and 35 in this fashion, a laser beam 39, or other concentrated beam of light, may be passed through alignment tool 11 from tip portion 17 to base portion 15. Laser beam 39 has a center line that is preferably along longitudinal axis 19 when laser beam 39 is parallel to shaft 13. Laser beam 39 will be represented herein by its center line.

It is preferred that the diameter of laser beam 39 be the same as, or slightly smaller than, the diameter of alignment apertures 33 and 35. This allows a user to quickly and easily determine whether laser beam 39 is parallel with longitudinal axis 19 of alignment tool 11. If laser beam 39 is parallel to longitudinal axis 19, but is not coaxial with longitudinal axis 19, a linear deviation in range D results. If laser beam 39 is not parallel with longitudinal axis 19, and is is not parallel with longitudinal axis 19, an angular deviation in range A results. In some embodiments, it may be desirable for alignment tool 11 to include optional transparent portions, or observation windows (not shown), that allow a user to see into the interior of hollow shaft 13. Such observation ports allow a user to visually inspect whether laser beam 39 is linearly or angularly misaligned with alignment apertures 33 and 35.

Figure 3:
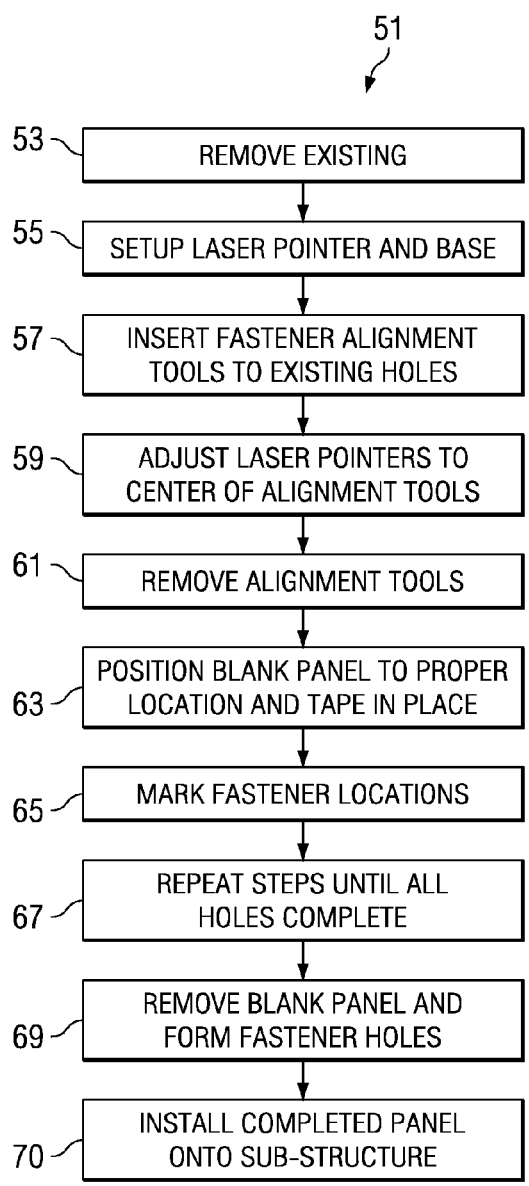
FIG. 3 is flow chart depicting a method of locating and aligning a fastener according to the present invention.
Figure 4:
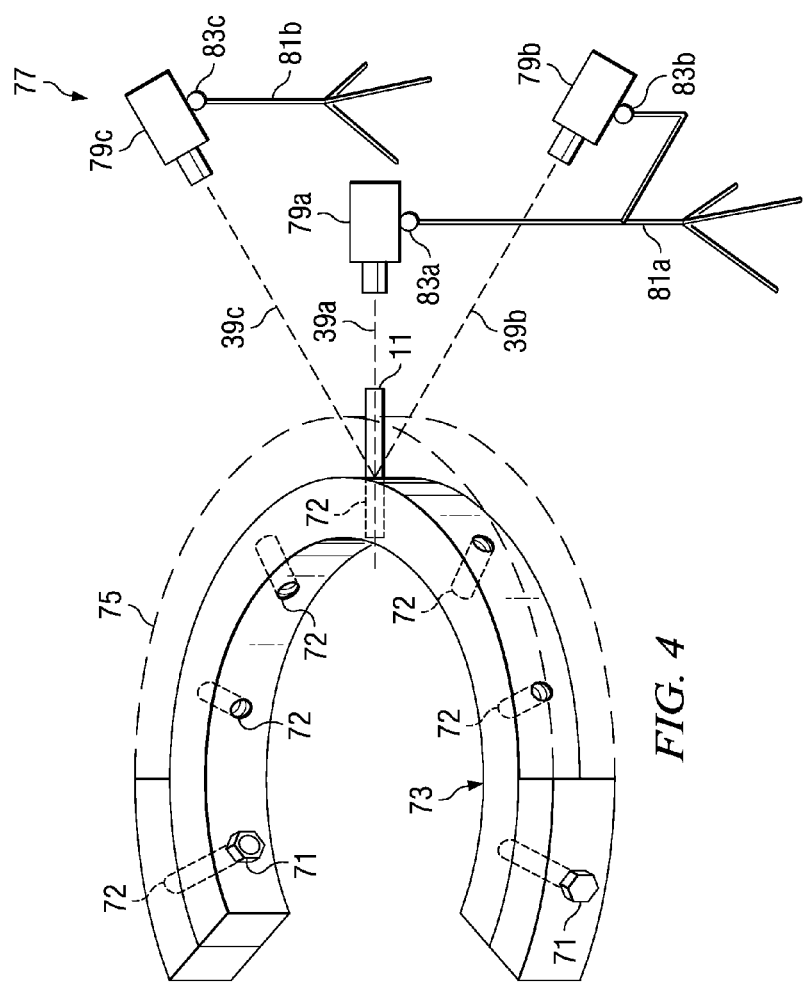
FIG. 4 is a schematic illustrating certain components used to carry out the steps of the method of FIG. 3.

Referring now to FIGS. 3 and 4 in the drawings, the method of the present invention is illustrated. FIG. 3 is a flow chart 51 depicting a simplified version of the alignment and marking process, and FIG. 4 is a schematic illustrating the components required to carry out the steps of flow chart 51. FIGS. 3 and 4 represent an application of the present invention in which fastener hole locations are precisely transferred from an existing aircraft sub-structure having complex contours and marked onto blank removeable or interchangeable panels, so that fastener holes can be drilled in the panel at the proper location and in the proper direction and orientation.

The process begins at step 53 by removing existing fasteners, such as fasteners 71, from fastener holes 72 in an existing panel and removing the panel from an existing sub-structure 73. The removed panel is represented in FIG. 4 by dashed line 75. Then, at step 55, a laser system 77 having at least one laser beam generating device 79a is installed on or near sub-structure 73. Laser device 79a is supported by a rigid support means 81a. In some applications, particularly in applications involving space constraints, sub-structure 73 may serve as support means 81a. Laser device 79a is capable of generating and projecting at least one laser beam 39a.

In the preferred embodiment, laser system 77 includes additional laser devices 79b and 79c capable of generating laser beams 39b and 39c, respectively. Laser devices 79b and 79c may be supported by support means 81a, or may be supported by additional support means 81b, as is shown. When additional laser devices 79b and 79c are used, it is preferred that additional laser devices 79a, 79b, and 79c be spaced apart in a triangular relationship, such that laser device 79a is perpendicularly aligned with alignment tool 11, and additional laser devices 79b and 79c are used to ensure that laser device 79a does not move relative to sub-structure 73 during the alignment and marking process.

Next, at step 57, one alignment tool 11 is installed into one fastener hole 72. In this example, attachment means 36 of alignment tool 11 comprises external threads that mate with internal threads of fastener hole 72. This allows alignment tool 11 to be simply screwed into fastener hole 72. The process continues at step 59, in which laser device 79a is positioned by one or more adjustment means 83a, such that laser beam 39a is projected through alignment tool 11 within selected allowable linear and/or angular misalignment tolerances. During this step, if additional laser devices 79b and 79c are used, such laser devices 79b and 79c are appropriately positioned and aligned. For example, additional laser devices 79b and 79c may be positioned such that laser beams 39b and 39c point to selected targets on alignment tool 11 or through ports in alignment tool 11. The use of additional laser devices 79b and 79c adds redundancy to the system and provides a means for indicating whether primary laser device 79a has inadvertently moved during the process. It will be appreciated that multiple alignment tools 11 and multiple sets of laser devices may be used to simultaneaously mark the blank panel.

After laser devices 79a, 79b, and 79c have been appropriately positioned, aligned, and secured in place, the process continues at step 61, in which alignment tools 11 are removed from fastener holes 72. The process continues at step 63 with the placement of a blank panel onto sub-structure 73. The blank panel is secured into place by a temporary attachment means, such as tape, clamps, adhesive, or other suitable releasable means. Once the blank panel is secured in place on sub-structure 73, the fastener locations and orientations will be targeted by laser beams 39a, 39b, and 39c. Then, according to step 65, the targeted locations are marked by one more suitable marking means, depending upon the material from which the blank panel is made. The marks on the blank panel can be made by surface marking, mechanical marking, chemical etching, or any other suitable marking method. As set forth in step 67, steps 53–65 are repeated for all of the necessary fastener hole locations. In the preferred embodiment, several reference fastener holes are located, marked, and formed in the blank panel, so that the blank panel can actually be fastened to the sub-structure while the remaining fastener holes are targeted and marked.

Once one or more fastener holes have been appropriately marked, the process continues with step 69, in which the blank panel is removed and fastener holes are precisely drilled, punched, or otherwise formed in the blank panel. The process concludes with step 70, in which the blank panel with all of the appropriate fastener holes formed therein, is installed with final fasteners onto sub-structure 73. Thus, the process of the present invention allows fastener holes to be located, aligned, and formed on blank removable and interchangeable panels while maintaining panel perpendicularity and close tolerances.

Figure 5A:
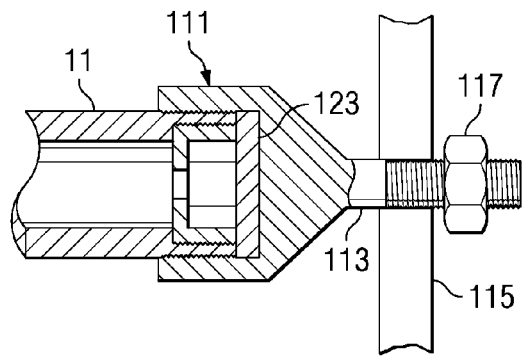
FIGS. 5A–5C are schematics of alternate embodiments of the alignment tool of the present.
Figure 5B:
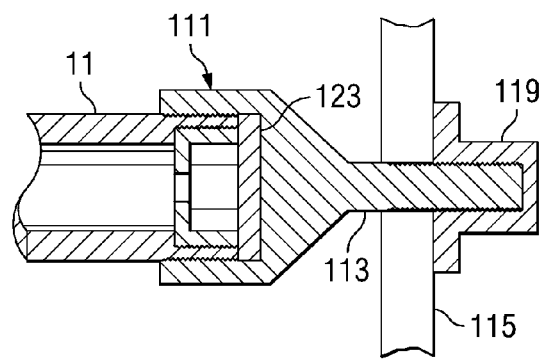
Figure 5C:
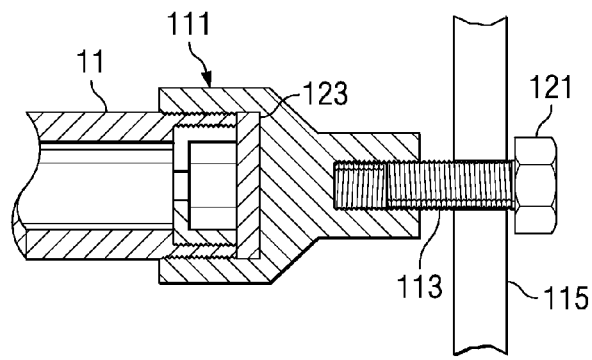

Referring now to FIGS. 5A–5C in the drawings, various alternate embodiments of alignment tool 11 are illustrated. In these embodiments, an adapter member 111 has been installed onto attachment means 36 of alignment tool 11 to facilitate the use of alignment tool 11 with different types of fastener applications. In the embodiment of FIG. 5A, adapter member 111 includes an insertion post 113 that is inserted through an aperture in a sub-structure 115. Insertion post 113 is retained by a captive nut 117. In the embodiment of FIG. 5B, insertion post 113 includes external threads that are matingly received by a threaded nut plate 119 attached to sub-structure 115. In the embodiment of FIG. 5C, insertion post 113 includes internal threads that matingly receive external threads of a stud bolt 121 that extends through sub-structure 115. In all of the embodiments of FIGS. 5A–5C, alignment tool 111 includes a sensor 123 for facilitating pinpoint alignment of a laser beam. It should be understood that adapter member 111 may take on a wide variety of shapes, sizes, and configurations.

Figure 6A:
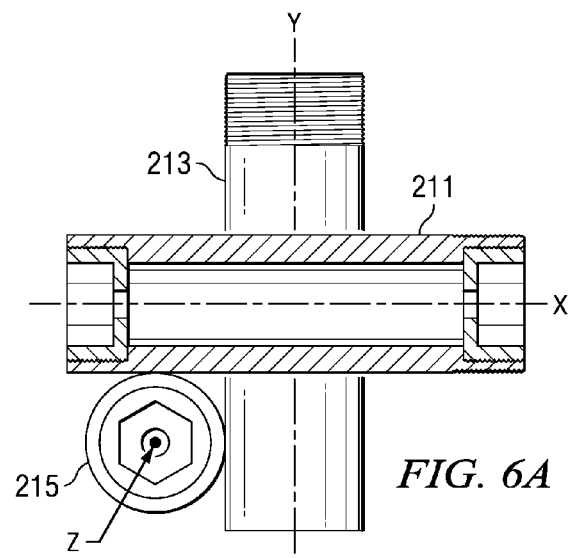
FIGS. 6A and 6B are schematics of additional alternate embodiments of the alignment tool of the present invention.
Figure 6B:
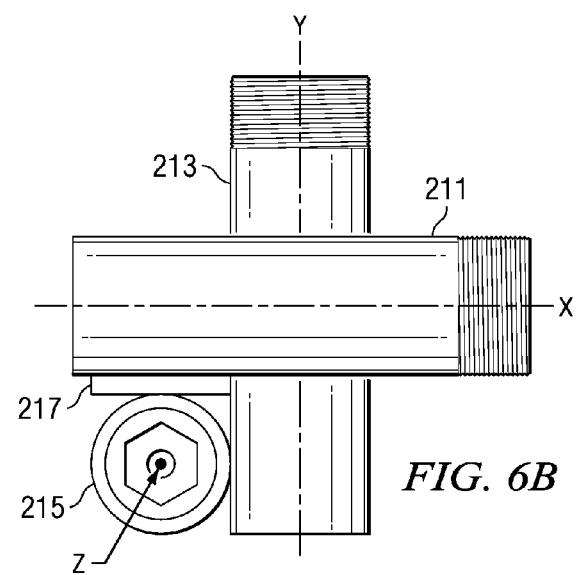

Referring now to FIGS. 6A and 6B in the drawings, additional alternate embodiments of the alignment tool according to the present invention are illustrated. In the embodiment of FIG. 6A, three separate alignment tools 211, 213, and 215 are coupled together along three orthographic axes X, Y, and Z. Alignment tools 211, 213, and 215 allow for the use of three laser devices to properly and accurately align and mark the locations of the necessary fastener holes. The use of additional alignment tools 213 and 215 with additional laser devices adds redundancy to the system and provides a means for indicating whether the primary laser device has inadvertently moved during the alignment process. The embodiment of FIG. 6B is similar to the embodiment of FIG. 6A, with the exception that at least one adjustment mechanism 217 has been added. Adjustment mechanisms 217 are preferably means for making very fine adjustments to the orientation of alignment tools 211, 213, and/or 215. Adjustment mechanisms 217 may be mechanically, electrically, or magnetically controlled, or may be controlled by any suitable control means.

Figure 7:
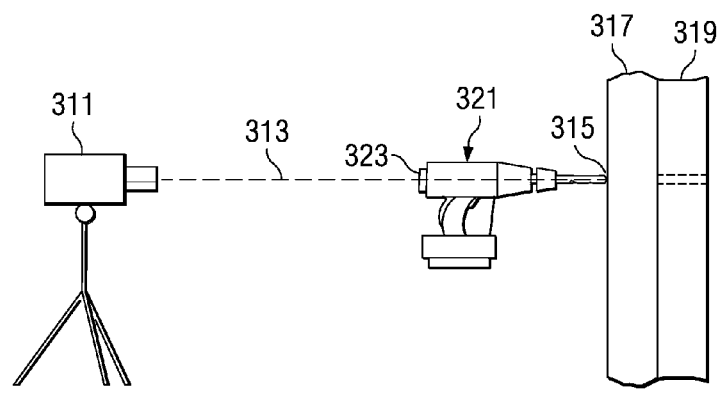
FIG. 7 is a schematic of an alternate embodiment of the method and apparatus of the present invention.

Referring now to FIG. 7 in the drawings, an alternate embodiment of the method and apparatus of the present invention is illustrated. In this embodiment, a laser device 311 is properly and accurately positioned using the method and alignment tools discussed above. As with the previous embodiments, laser device 311 is accurately positioned using various alignment tools 11. Then, alignment tools 11 are removed and a blank panel 317 is positioned over a sub-structure 319 and held in place, such that a laser beam 313 from laser device 311 targets a location 315 on blank panel 317. Once location 315 is targeted, a drill 321, or other suitable device for forming a fastener hole in blank panel 317, is aligned to drill a fastener hole in blank panel 317 at the targeted location 315. Drill 321 preferably includes an alignment means 323 that receives laser beam 313 and ensures that drill 321 remains properly aligned during the drilling or forming process. It will be appreciated that laser beam 313 may pass through the interior of drill 321, or may be redirected around the exterior of drill 321. This embodiment eliminates the need to remove blank panel 317 to drill each fastener hole.

The invention can be used in any application for multiple part assembly alignment or location with any tolerance range. In addition, it will be appreciated that the present invention may be carried out by an automated or robotic system. For example, all of the fastener holes can be aligned by the laser devices and the positions of the laser devices can be precisely recorded, so that the laser devices can be automatically and precisely repositioned after the alignment tools have been removed and the blank panel has been installed.

It is apparent that an invention with significant advantages has been described and illustrated. Although the present invention is shown in a limited number of forms, it is not limited to just these forms, but is amenable to various changes and modifications without departing from the spirit thereof.

We claim:

1. A method of locating and aligning a fastener hole, the method comprising the steps of:
   providing an alignment tool having an attachment means and at least one alignment aperture;
   attaching the alignment tool to a fastener hole in a first structure with the attachment means;
   providing a laser targeting device;
   positioning the laser targeting device, such that a laser beam generated by the laser targeting device projects through the alignment aperture within a selected tolerance;
   removing the alignment tool from the fastener hole;
   placing a second structure on the first structure such that the laser beam targets a location for a fastener hole on the second structure that is aligned with the fastener hole in the first structure;
   while the alignment tool is removed and the laser beam targets the location on the second structure, marking the target location on the second structure; and
   forming a fastener hole in the second structure corresponding to the targeted location.

2. The method according to claim 1, wherein the alignment tool comprises:
   an elongated hollow shaft;
   a first alignment aperture in one end of the shaft; and
   a second alignment aperture in the opposite end of the shaft.

3. The method according to claim 2, wherein the first alignment aperture is located in a first insert installed on one end of the hollow shaft; and
   wherein the second alignment aperture is located in a second insert installed on the other end of the hollow shaft.

4. The method according to claim 1, wherein the attachment means is external threads that mate with internal threads disposed within the fastener hole of the first structure.

5. The method according to claim 1, further comprising the steps of:
   providing additional laser targeting devices; and
   positioning the additional laser targeting devices, such that laser beams generated by the additional laser targeting devices are located on selected targets on the alignment tool within selected tolerances.

6. The method according to claim 1, further comprising the steps of:
   providing an adapter member for adapting the alignment tool for attachment to a selected fastener hole configuration in the first structure; and
   attaching the adapter member to the alignment tool.

7. The method according to claim 6, further comprising the steps of:
   providing a sensor on the adapter member for pinpointing the location of the laser beam on the adapter member.

8. The method according to claim 1, wherein the alignment tool comprises:
   a first elongated hollow shaft having a first alignment aperture in one end and a second alignment aperture in the opposite end; and at least one other elongated hollow shaft having a first alignment aperture in one end and a second alignment aperture in the opposite end;

wherein the second elongated shaft is coupled to the first elongated shaft at a selected angle.

9. The method according to claim 8, wherein the alignment tool further comprises:

at least one adjustment means for adjusting the angle of the second elongated shaft relative to the first elongated shaft.

10. The method according to claim 1, wherein the step of forming a fastener hole in the second structure comprises the steps of:

providing a tool for forming the fastener hole; and
using the laser beam to guide the tool in forming the fastener hole.

11. A method of locating and aligning a first structure relative to a second structure, the method comprising the steps of:

providing an alignment tool having at least one alignment aperture;
attaching the alignment tool to the first structure;
providing a laser targeting device;
positioning the laser targeting device such that a laser beam generated by the laser targeting device projects through the alignment aperture within a selected tolerance;
removing the alignment tool from the first structure; and
placing a second structure on the first structure such that the laser beam aligns with a target on the second structure while the alignment tool is removed.

12. An alignment tool, comprising:

an elongated hollow shaft;
a first alignment aperture in one end of the shaft;
a second alignment aperture in the opposite end of the shaft; and
a laser device for aligning the first and second alignment apertures, the laser device being spaced from and not structurally connected to the hollow shaft, such that the laser device is translatable relative to the hollow shaft.

13. The alignment tool according to claim 12, wherein the first alignment aperture is located in a first insert installed on one end of the hollow shaft; and wherein the second alignment aperture is located in a second insert installed on the other end of the hollow shaft.

14. The alignment tool according to claim 12, further comprising:

an attachment means disposed at one end of the elongated hollow shaft, the attachment means being configured to mate with a fastener hole on a substructure.

15. The alignment tool according to claim 12, further comprising:

an adapter member for adapting the alignment tool for attachment to a selected fastener hole configuration.

16. The alignment tool according to claim 15, further comprising:

a sensor disposed on the adapter member for pinpointing the location of a laser beam from the laser device.

17. The alignment tool according to claim 12, further comprising:

at least one other elongated hollow shaft having a first alignment aperture in one end and a second alignment aperture in the opposite end;
wherein the second elongated shaft is coupled to the first elongated shaft at a selected angle.

18. The alignment tool according to claim 17, further comprising:

at least one adjustment means for adjusting the angle of the second elongated shaft relative to the first elongated shaft.

19. An alignment tool, comprising:

an elongated hollow shaft;
a first alignment aperture located in a first insert installed on one end of the hollow shaft;
a second alignment aperture located in a second insert installed on an opposite end of the hollow shaft; and
a laser device for aligning the first and second alignment apertures.

20. An alignment tool, comprising:

an elongated hollow shaft;
a first alignment aperture in one end of the shaft;
a second alignment aperture in an opposite end of the shaft;
a laser device for aligning the first and second alignment apertures;
an adapter member for adapting the alignment tool for attachment to a selected fastener hole configuration; and
a sensor disposed on the adapter member for pinpointing the location of a laser beam from the laser device.

* * * * *